INVENTORS
Fred W. Carlton
Jesse W. Carlton

INVENTORS
Fred W. Carlton
Jesse W. Carlton
BY Merriam, Marshall, Shapiro & Klose
ATTYS.

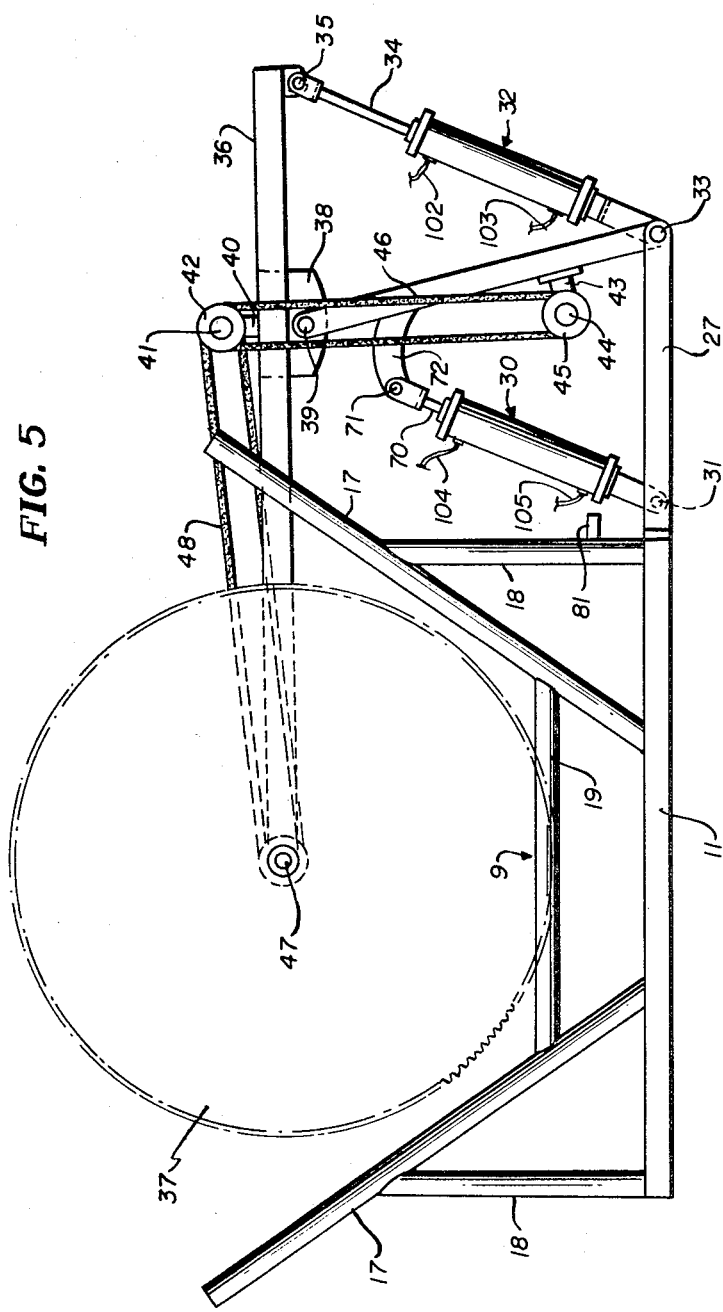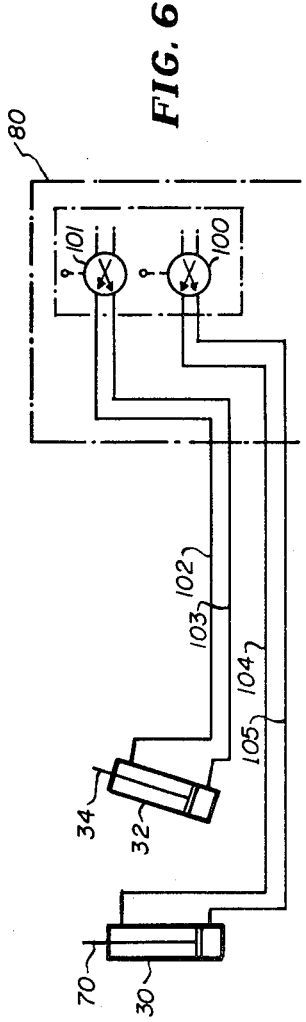

United States Patent Office 3,718,060
Patented Feb. 27, 1973

3,718,060
LOG-CUTTING APPARATUS
Fred W. Carlton and Jesse W. Carlton, both of
Rte. 1, Oxford, Wis. 53952
Filed Sept. 21, 1970, Ser. No. 73,965
Int. Cl. B27b 5/10
U.S. Cl. 83—84                                    12 Claims

ABSTRACT OF THE DISCLOSURE

A mobile log-cutting device which utilizes a pivotally actuated cutting means which is readily and safely engaged and disengaged from the logs being cut during a log-cutting operation.

BACKGROUND OF THE INVENTION

The present invention relates to an improved log-cutting device and more particularly to a mobile log-cutting device which can be safely actuated by a single operator.

In the logging industry, it is desired to have mobile log-cutting devices which can be operated by a sole operator and moved from one log-cutting site to another. While it is desirable to have a device which can be actuated by a single operator without any undue difficulty, it is important that safety precautions be taken to protect the operator from injury during a log-cutting operation. Unfortunately, a disadvantage attendant with some mobile log-cutting devices involves the hazards associated with the rotary cutting saw employed in the cutting operation. The saw rotates at a high rate of speed and if it is not carefully controlled, it can severely injure an operator or other individuals. Accordingly, the saw must be selectively controlled so that it will not rotate when it is in an inoperative, non-cutting position. Moreover, it is desired to achieve this control in a relatively inexpensive manner as opposed to employing an expensive disengaging member between the rotary saw and the means employed to drive it.

SUMMARY OF THE INVENTION

In an effort to achieve a log-cutting device which utilizes a cutter which is readily and safely disengaged from the driving means, we have invented a new and unobvious log-cutting device which employs a pivotal actuating member, which, when moved into proper position, permits the saw to rotate.

The log-cutting apparatus of the present invention is a mobile unit capable of being moved easily and readily from one area to another.

In a log-cutting operation employing the log-cutting device of the present invention, one operator, who is preferably located in a cab or enclosed area spaced from the log-cutting saw, is able, without need of getting out of the cab, to lift tree stems to be cut onto a cradle, actuate the saw and move it to a cutting position whereby the stem or log is cut to a predetermined size, move the saw to a non-cutting position, disengage the saw from the drive means and load the cut logs onto a flat bed semi-trailer, which takes the logs to a mill or some other location for further processing.

The log-cutting device of the present invention is comparatively compact as compared to other log-cutting units. In addition to being relatively easy to operate, whereby one individual can carry out a log-cutting operation while being protected in a cab or enclosure spaced from the cutting device, the log-cutting apparatus of the present invention is capable of being driven by a single drive means such as a truck or tractor engine.

Other features and advantages are inherent in the subject matter disclosed and claimed herein, as will become apparent to those skilled in the art from the following detailed description, including the accompanying drawings, wherein:

BRIEF DESCRIPTION OF THE DRAWINGS

FIG. 5 is an enlarged, fragmentary end view of the cutter actuating device of the present invention in which the cutter is in an operative, cutting position; and, FIG. 6 is a schematic view of the control system for operating the cutting device of the present invention.

Figure 1:
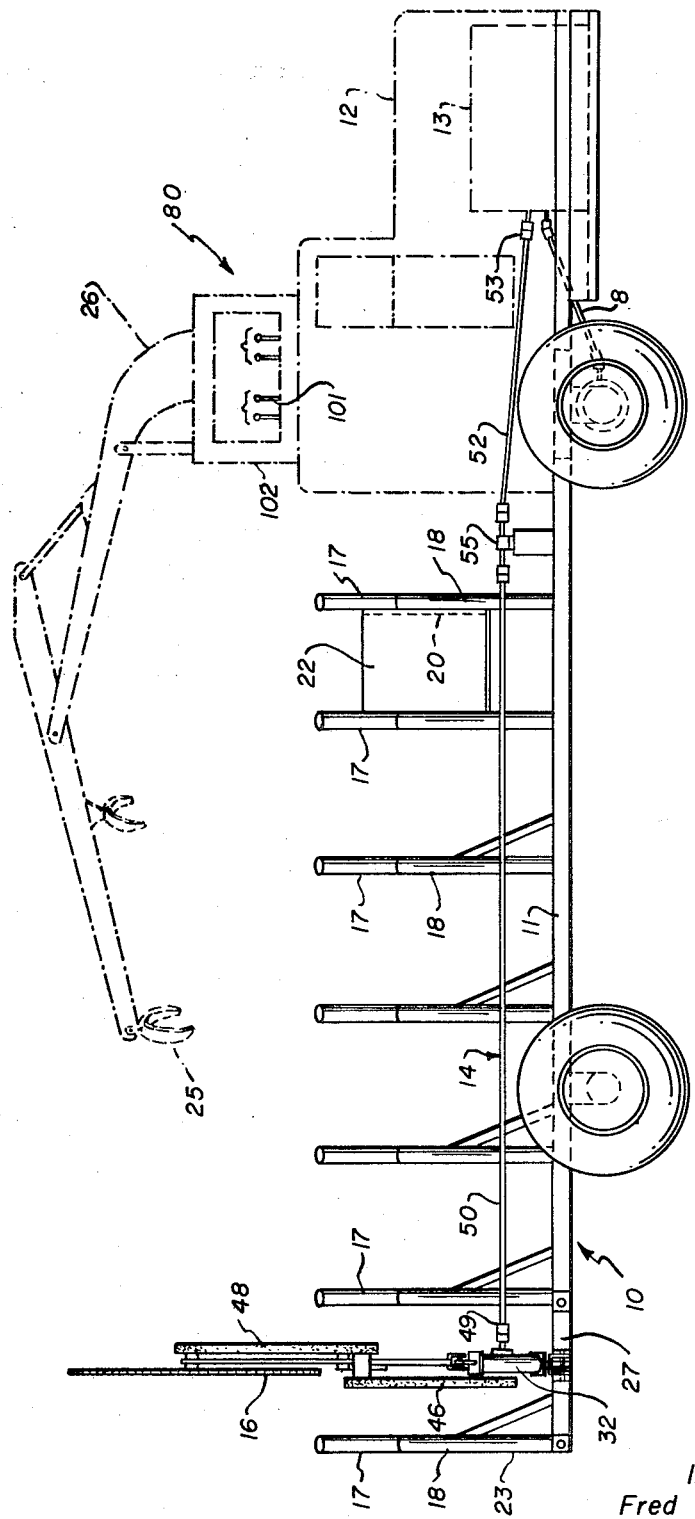
FIG. 1 is a side view of the mobile log-cutting device of the present invention.
Figure 2:
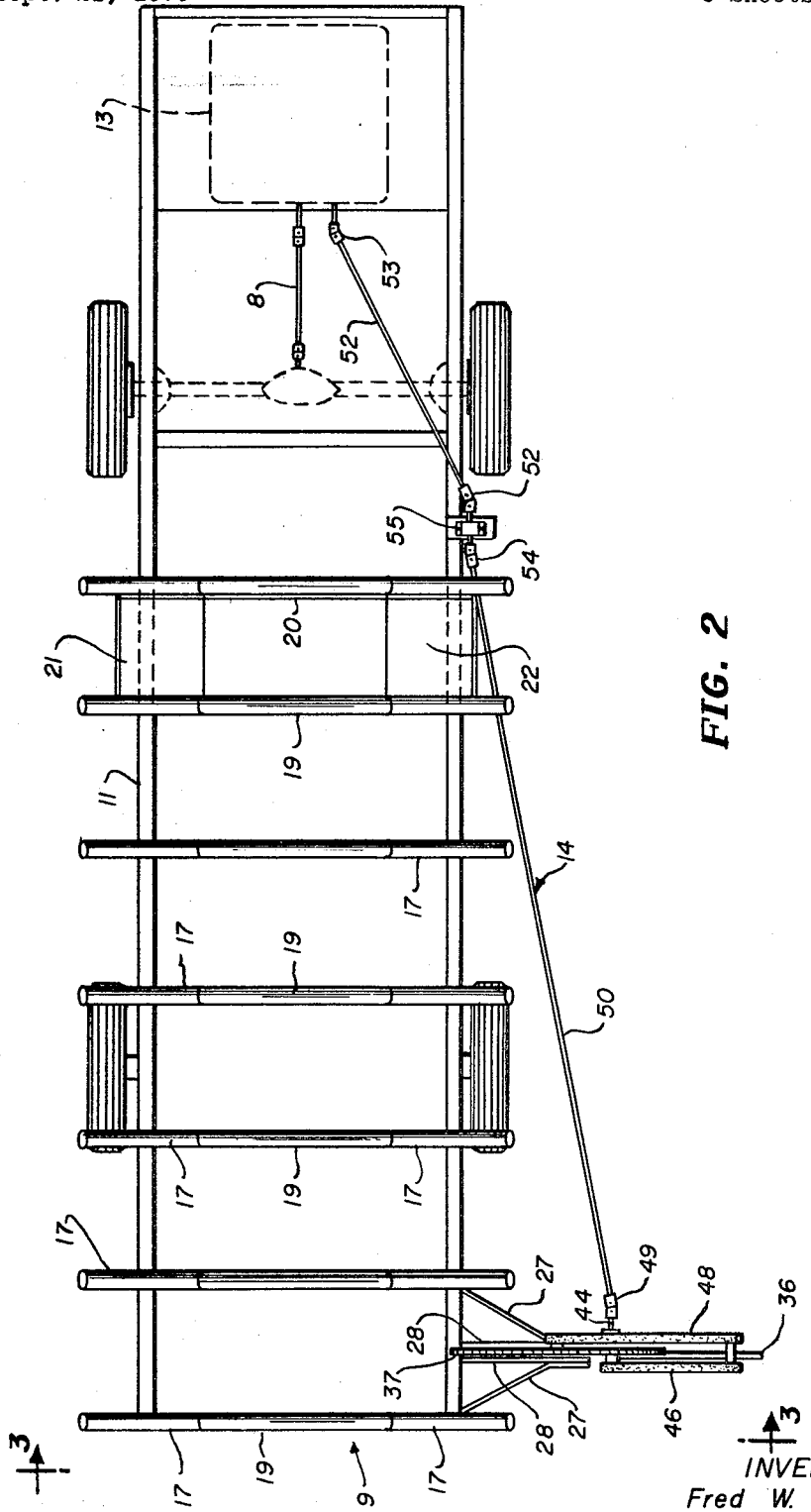
FIG. 2 is a partial top view of the mobile log-cutting device of the present invention.

Referring to the drawings and more particularly to FIGS. 1 and 2, there is shown a mobile log-cutting unit 10 comprising a substantially flat trailer 11 and tractor 12, the latter being shown in dotted lines as this would be conventional. Engine 13 which is employed for driving unit 10 has one power take-off 8 which serves to transmit the necessary power to drive the mobile unit and an additional power take-off 14 which is connected to and supplies power to a log-cutting mechanism 16.

Frame 11 has a cradle 9 for receiving a log or logs to be cut. The cradle comprises a plurality of spaced posts 17 located along the both sides of the length of the frame. The posts extend outwardly from frame 11 at an angle to form somewhat of a V-shaped cradle. Posts 17 are supported by vertical struts 18 while horizontal posts 19, which are connected at their ends to inclined posts 17, form the bottom portion of the log cradle.

At the forward end of frame 11, abutting wall 20 is preferably provided to act as a stop for logs placed in cradle 9. Additional walls 21, 22 which are welded or fastened by other suitable means to posts 17, are shown in FIGS. 1 and 2, as extending along a portion of frame 11. Walls 20, 21 and 22 serve to contain the travel of a log as it is placed on unit 10 from the aft end 23 by means of a grapple 25 of a loader 26 which picks up one or more logs to be cut and places them in the cradle.

Cutting apparatus 16 is preferably attached to a side of frame 11, contiguous to the aft end 23. Referring more particularly to FIGS. 2–5 inclusive, apparatus 16 includes a pair of brackets 27 which extend outwardly from frame 11 and are positioned so that they extend toward each other. Disposed within brackets 27 are support members 28 which have one end joined to brackets 27 while their remaining ends are welded or joined to frame 11 by other suitable means.

A hydraulic cylinder 30 is pivotally mounted to members 28. At the outer ends of brackets 27 and members 28, link 31 and hydraulic cylinder 32 are pivotally mounted at 33. Piston rod 34 of cylinder 32 is pivotally connected at 35 to one end of an elongated saw arm 36. Rotary saw 37 is connected to the other end of arm 36. Bracket 38 is fixed to arm 36 intermediate its length in such a manner that bracket 38 is pivotally connected at 39 to the remaining end of link 31.

Piston rod 70 of cylinder 30 is pivotally connected at 71 to one end of arm 72 while the remaining end of arm 72 is fixed to link 31 by welding or other suitable means.

Figure 3:
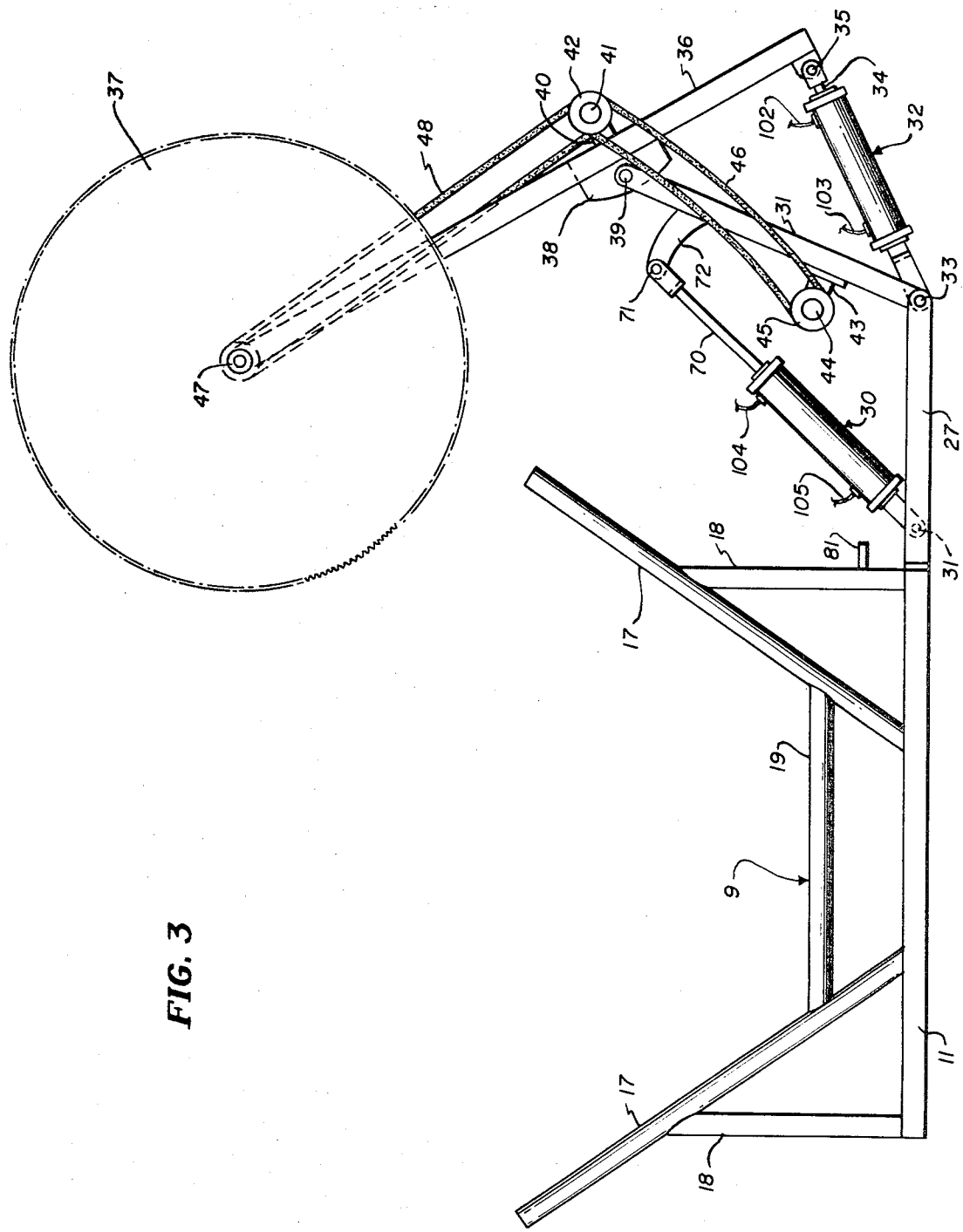
FIG. 3 is an enlarged, fragmentary end view of the cutter actuating device of the present invention in which the cutter is in an inoperative, disengaged position.
Figure 4:
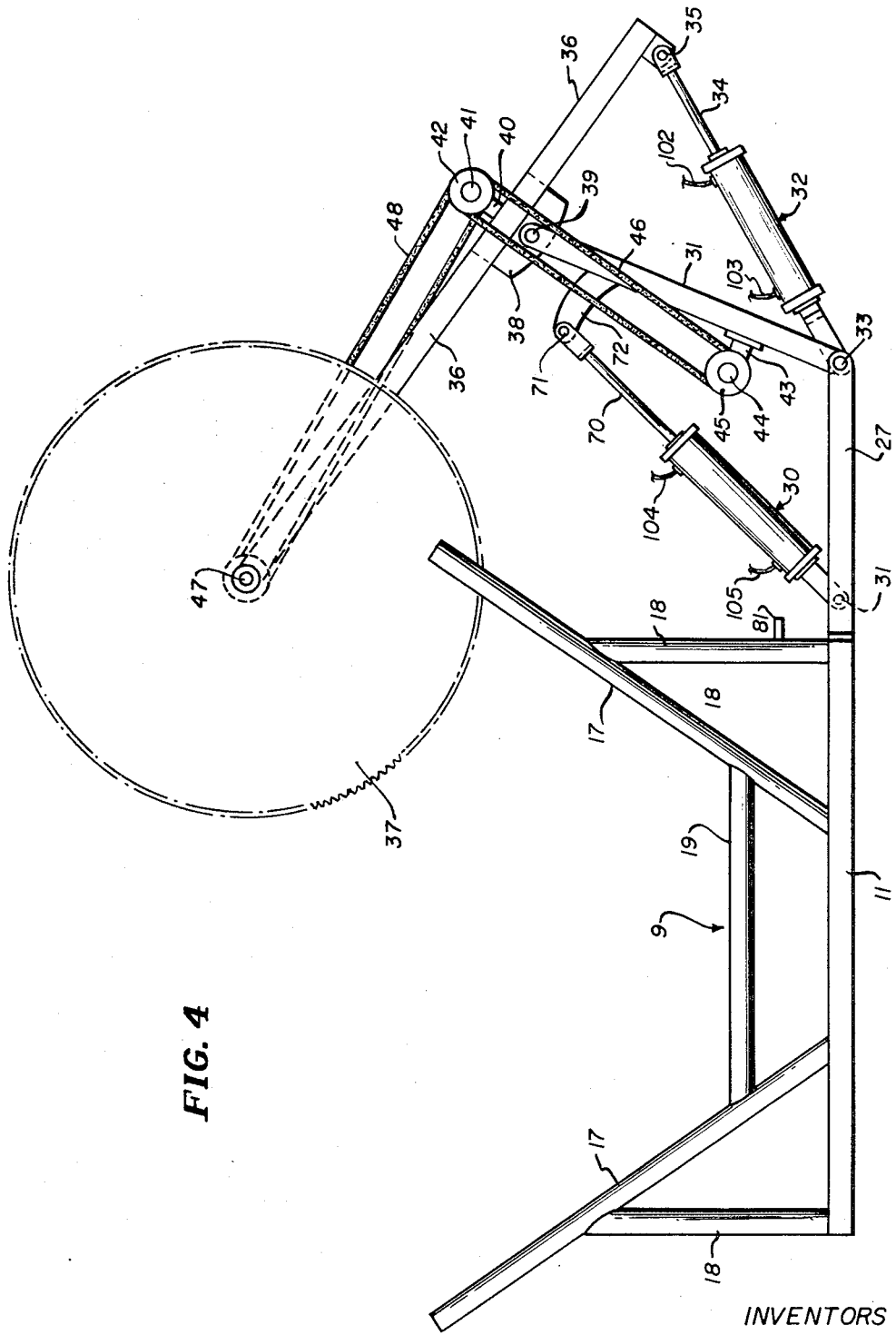
FIG. 4 is an enlarged, fragmentary end view of the cutter actuating device of the present invention in which the cutter is in an inoperative, engaged position.

As clearly shown in FIGS. 3–5 inclusive, sheave bracket 40, which is spaced a predetermined distance from pivot 39, holds shaft 41 which is located in a bearing (not shown). One or more sheaves 42 are fastened to shaft 41.

A second sheave bracket 43, which can be adjustably positioned along link 43, is fixed to link 31 at a predetermined location along the length of the link. Bracket 43 holds shaft 44, located in a bearing (not shown), with one or more sheaves 45 being fastened to shaft 44. Sheaves 42 and 45 are connected together by one or more endless belts 46.

Rotary saw 37 is attached to a drive shaft 47 with power to the drive shaft being transmitted by means of one or more endless belts 48 which are located on the sheaves fastened to shafts 41 and 47.

Drive shaft 44 is coupled by means of a universal joint 49 (FIG. 2) to drive shaft 50 which leads to the vehicle engine 13 by means of shaft 51, universal joints 52, 53, 54 and bearing station 55.

OPERATION

The operation of the log-cutting device of the present invention can be seen more clearly upon viewing FIGS. 3–5 inclusive. Initially, power to operate saw 37 is drawn from engine 13 and transmitted through power take-off 14 to drive shaft 44. In FIG. 3, saw 37 is shown in an inoperative, non-cutting position with endless belt 46 connecting sheaves 42, 45 being in a relaxed or untensioned condition whereby shaft 44 and sheaves 45 rotate freely without any substantial movement of belt 46.

In a log-cutting operation, grapple 25 of loader 26 will grasp one or more logs to be cut and deposit them in cradle 9 with one end of the logs preferably abutting wall 20. The logs are of a length that they will initially extend back from wall 20 past the cutting station where the other end of the log either lays on the ground or projects out beyond the end of cradle 9.

Cylinder 32 is then actuated by suitable valve means causing rod 34 to move outward which in turn pivots arm 36 about pivot 39 as seen in FIG. 4. It will be observed in comparing FIGS. 3 and 4 that shaft 44 and pivot 39 will be fixed relative to each other at all times irrespective of the position of rod 34. However, the distance between shafts 44 and 41 will change depending upon the position of arm 34. As rod 34 moves outward away from cylinder 32, arm 36 is pivoted about pivot 39 causing shaft 41 to be spaced further from shaft 44. As the distance between shafts 41 and 44 is increased, belt 46 is stretched causing the belt to grip tightly against rotating sheaves 45 which in turn imparts movement to belt 46, sheaves 42, belt 48, shaft 47 and rotary saw 37.

When the saw is engaged, cylinder 30 is actuated by any suitable valve means whereupon rod 70, which is extended when the saw is in an inoperative position, is withdrawn back into cylinder 30. Movement of rod 70 pulls arm 71, link 31 and saw arm 36 having saw 37 attached thereto about pivot 31 causing saw 37 to cut a log or logs located in cradle 9.

Following a cutting operation, cylinder 30 is actuated causing rod 70 to move outward thereby moving saw 37 to the inoperative condition of FIG. 4. Upon actuation of cylinder 32, rod 34 is withdrawn into cylinder 32 causing the distance between shafts 44 and 41 to decrease which, in turn, causes slack in belt 46 such that power is not transmitted to shaft 42, belt 48 and saw 37.

The distance that arm 36 can be pivoted about pivot 39 is limited in order that distance between shafts 44 and 41 is not substantially reduced when rod 70 is drawn into cylinder 30 in the course of a cutting operation. Any suitable means can be employed to limit the movement of cylinder 30 about pivot 31 such that the tension on belt 46 is not relaxed. For example, lug 81, attached to a strut 18, projects outwardly to act as a positive stop means for limiting the travel of and shaft cylinder 30.

The operator of the log-cutting apparatus of the present invention is located in cab 80 which, as shown for example in FIGS. 1 and 6, spaced from the saw 37. From the cab, the operator can control the operation of loader 26 and hydraulic piston means 30, 32 which control the operation of saw 37. While safely located in the cab, an operator, by actuating control means 102, can pick up logs or stems to be cut and place them on cradle 9. The operator then actuates the cutting device 16 by actuating valves 100, 101, which, via lines 102, 103, 104, and 105, lead to the hydraulic piston means 30, 32. Following a cutting operation, the operator moves saw 37 to a non-cutting position and disengages it from the drive means. He then picks up the cut logs from cradle 9 with grapple 25 and deposits them in a flat bed semi-trailer or other suitable carrier generally located adjacent the log-cutting apparatus. The operator can then repeat the operation of moving logs to be cut onto the cradle, actuating the cutting means, sawing the logs and removing the cut logs to a new position.

It has been found that the portable log-cutting device of the present invention can be easily and safely operated by one individual.

The foregoing detailed description has been given for clearness of understanding only, and no unnecessary limitations should be understood therefrom as modifications will be obvious to those skilled in the art.

What is claimed is:

1. A mobile log-cutting apparatus which is capable of being operated by one individual, said apparatus comprising:
    a supporting means for supporting logs to be cut;
    a log pick-up means for loading logs to be cut on said supporting means and removing logs from said supporting means following a cutting operation;
    said log pick-up means being disposed contiguous to said supporting means;
    a cutting apparatus attached to said supporting means, said apparatus comprising:
        a cutting means;
        drive means spaced from said cutting means;
        means for connecting said drive means to said cutting means;
        said connecting means including a first pivot means for pivoting said cutting means relative to said drive means such that said cutting means is adapted to be moved from an inoperative to an operative driven position;
        additional pivoting means for positioning said cutting means in cutting and non-cutting positions relative to said supporting means; and
        control means spaced from said cutting apparatus for actuating said cutting apparatus and log pick-up means
    whereby one or more logs to be cut can be picked up and cut by a single operator.

2. A mobile log-cutting apparatus in accordance with claim 1 wherein said first and second pivoting means each include hydraulic means.

3. A mobile log-cutting apparatus in accordance with claim 1 wherein said connecting means further includes:
    an elongated arm having two ends;
    one end of said arm being connected to said cutting means;
    said first pivoting means being connected to said supporting means and to said remaining end of said arm;
    a link means being connected to said support means and to said elongated arm; and,
    said second pivoting means being connected to said support means and said link means.

4. A portable cutting device in accordance with claim 1 further including an engine for driving said mobile device and a power take-off means from said engine to said drive means.

5. A log-cutting device comprising:
    a supporting means for receiving logs to be cut;
    a log-cutting apparatus comprising:
    a first bracket means;
    a link moving means having one of its two ends pivotally connected to said first bracket means;

an arm moving means having one of its two ends pivotally connected to said first bracket means;
an elongated arm;
cutting means located at one end of said arm and the remaining end of said arm moving means pivotally connected to the remaining end of said arm;
a second bracket means fixed to said elongated arm intermediate the length of said arm;
a link having two ends;
one of said link ends being pivotally connected to said first bracket means while the remaining link end is pivotally connected to said second bracket means;
said remaining end of said link moving means being pivotally connected to said link;
a first driving means fixed to said link intermediate the length of said link;
a second driving means fixed to said elongated arm and spaced from said second bracket means a predetermined amount;
means connecting said first and second driving means such that when said connecting means are in a slack condition said first driving means is spaced close to said second driving means and said cutting means is not driven, and when said connecting means are in a tensioned condition said first driving means is spaced further apart from said second driving means and said cutting means is driven.

6. A log-cutting device in accordance with claim 5 wherein said link moving means and arm moving means comprise hydraulic means.

7. A mobile log-cutting device comprising:
a supporting means for receiving logs to be cut;
a log-cutting apparatus comprising:
a first bracket means;
a first hydraulic piston means having one of its two ends pivotally connected to said first bracket means;
a second hydraulic piston means having one of its two ends pivotally connected to said first bracket means;
an elongated arm;
cutting means located at one end of said arm and the remaining end of said second piston piston means pivotally connected to the remaining end of said arm;
a second bracket means fixed to said elongated arm intermediate the length of said arm;
a link having two ends;
one of said link ends being pivotally connected to said first bracket means while the remaining link end is pivotally connected to said second bracket means;
said remaining end of said first piston means being pivotally connected to said link;
a first driving means fixed to said link intermediate the length of said link;
a second driving means fixed to said elongated arm and spaced from said seond bracket means a predetermined amount;
means connecting said first and second driving means such that when said connecting means are in a slack condition said first driving means is spaced close to said second driving means and said cutting means is not driven, and when said connecting means are in a tensioned condition said first driving means is spaced further apart from said second driving means and said cutting means is driven.

8. A mobile log-cutting device in accordance with claim 7 further including:
a second connecting means for connecting said first drive means to said cutting means.

9. A mobile log-cutting device in accordance with claim 7 further including:
an engine for driving said mobile device and a power take-off means from said engine to said second drive means.

10. A mobile log-cutting device in accordance with claim 9 further including a cradle located on said supporting means.

11. A mobile log-cutting device in accordance with claim 10 wherein said cradle includes a plurality of angularly inclined posts located on and extending outwardly from said supporting means to form a V-shape cradle for receiving logs.

12. A mobile log-cutting apparatus in accordance with claim 2 wherein said drive means are positioned on said link and said elongated arm.

References Cited

UNITED STATES PATENTS

| | | | |
|---|---|---|---|
| 3,414,027 | 12/1968 | Larva, Sr., et al. | 144—3 DX |
| 3,455,352 | 7/1969 | Sanders et al. | 144—3 D |
| 1,656,311 | 1/1928 | Anthony | 143—46 R |
| 2,096,305 | 10/1937 | Miller | 143—41 R |
| 3,550,653 | 12/1970 | Gauthier et al. | 144—3 DX |
| 3,500,882 | 3/1970 | Tanguay | 144—3 D |

ANDREW R. JUHASZ, Primary Examiner

J. F. COAN, Assistant Examiner

U.S. Cl. X.R.

144—3 D; 30—388; 83—471, 928